United States Patent [19]

LaRoche et al.

[11] Patent Number: 5,437,798
[45] Date of Patent: Aug. 1, 1995

[54] PURIFICATION OF SALT-CHARGES WASTE WATER BY WET OXIDATION UNDER SUPER-CRITICAL CONDITIONS

[75] Inventors: Hans L. LaRoche; Markus Weber, both of Zürich; Beat Zehnder, Dübendorf, all of Switzerland

[73] Assignee: Sulzer Chemtech AG, Winterthur, Switzerland

[21] Appl. No.: 199,864

[22] Filed: Feb. 22, 1994

[30] Foreign Application Priority Data

Feb. 2, 1993 [EP] European Pat. Off. ............ 93810129

[51] Int. Cl.[6] ................................................. C02F 1/72
[52] U.S. Cl. ................................................. 210/761
[58] Field of Search ........................................ 210/761

[56] References Cited

U.S. PATENT DOCUMENTS

| | | | |
|---|---|---|---|
| 4,113,446 | 9/1978 | Modell et al. | 423/650 |
| 4,338,199 | 7/1982 | Modell | 210/761 |
| 4,543,190 | 9/1985 | Modell | 210/761 |
| 4,822,497 | 4/1989 | Hong | . |

FOREIGN PATENT DOCUMENTS 0506069  9/1992  European Pat. Off. .

WO92/21621 12/1992 WIPO .

OTHER PUBLICATIONS

Schilling, W. et al, "Combustion and Diffusion at High Pressures to 2000 bar", Ber. Bunsenges Phys. Chem 92, 631–636 (1988).

*Primary Examiner*—Neil McCarthy
*Attorney, Agent, or Firm*—Townsend and Townsend Khourie and Crew

[57] ABSTRACT

With the process according to the invention for the purification of salt-charged waste water by wet oxidation of organic constituents under supercritical conditions, the reaction is performed in the form of a flame (5). In this case the supercritical zone is surrounded with a subcritical by-pass flow (4) formed from cooling water. At one end of the reactor (1) constructed as a cylindrical pressure vessel are provided at least one burner nozzle (2) and at least one annular inlet point (48), surrounding the burner nozzle, for the cooling water; at the other end is disposed at least one common outlet point (160) for cooling water, reaction products and in particular precipitated salts. Thanks to the by-pass flow there are no obstructions caused by salts; and corrosion problems are substantially reduced.

19 Claims, 2 Drawing Sheets

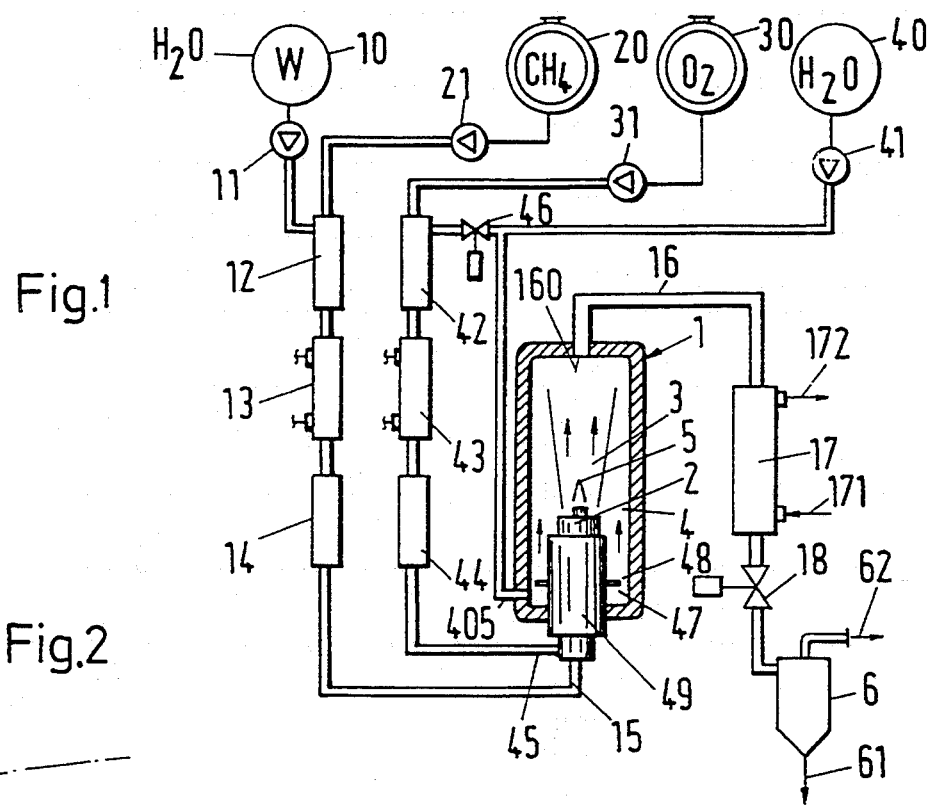
Fig.1
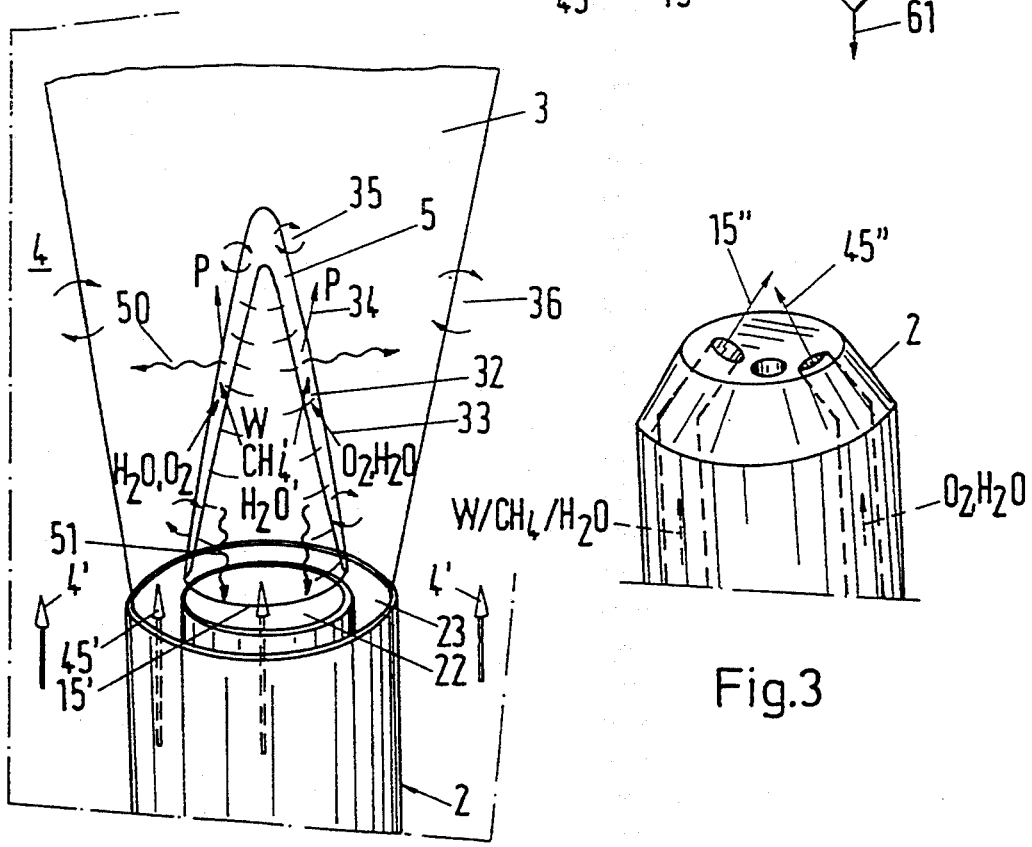
Fig.2
Fig.3

PURIFICATION OF SALT-CHARGES WASTE WATER BY WET OXIDATION UNDER SUPER-CRITICAL CONDITIONS

BACKGROUND OF THE INVENTION

The invention relates to a process for the purification of salt-charged waste water by wet oxidation of organic constituents under super-critical conditions and also a reactor for performing the process.

U.S. Pat. No. 4,822,497 discloses such a process, a so-called SCWO process (SCWO=SuperCritical Water Oxidation). The reaction takes place in a vertically erected, cylindrical pressure vessel. A semi-critical or supercritical mixture of waste water, fuel and oxygen is supplied through a nozzle axially protruding from above into the reactor. After the reaction the hot fluid is drawn off with the reaction products in the upward direction. During the reaction salt precipitates abruptly in the form of small crystals (size in the micrometer range) and is partly deposited at the bottom of the reactor in a subcritical region, where it is removed by means of cold water as brine or a solid-brine mixture.

In a further development of this SCWO process (by ABB-LummusCrest) with a falling film of cooling water in the lower reactor section it is ensured that the salt does not become baked onto the reactor wall. Of course in the upper section salt can become deposited on the reactor wall and thus in time result in obstructions. The SCWO process is used in the disposal of process water which is difficult to or impossible to decompose biologically (e.g. in paper production). Amongst others, the process is particularly suitable for destroying dangerous substances such as dioxines, furanes, polychlorinated biphenyls (PCB), and warfare agents.

In the SCWO processes one is confronted with two main problems: Firstly the solubility of salts strongly decreases in the region around the critical point of water, which results in the deposit of salts and finally in obstructions. Secondly very corrosive conditions result because of the presence of salt at elevated temperatures.

SUMMARY OF THE INVENTION

Therefore an object of the invention is to create an SCWO process and a reactor to perform the process in which obstructions by precipitated salts are to a large extent prevented and in which the problem of corrosion is removed. This object is achieved in accordance with the invention by enveloping the supercritical zone with a subcritical zone formed with a by-pass flow of cooling water, reacting the organic constituents in a flame, and removing the reaction products mixed with the cooling water from the reactor.

The following is achieved by the subcritical by-pass flow according to the invention: Firstly keeping the temperature of the reactor wall low by the heat radially leaving the reaction zone being removed by the by-pass flow. Secondly prevention of salt precipitation as the by-pass flow dissolves the solid salt radially leaving the reaction zone by its subcriticality and carries it away.

In addition to the oxidizable constituents of the waste water, in general a fuel has to be added by mixing so that the temperature required for the supercritical conditions can be attained or can be maintained stable. As in supercritical conditions gaseous hydrocarbons are soluble in water, methane, for example, can be used as a fuel. Of course fuels which are also soluble in water under subcritical conditions, such as, for example, methanol or isopropanol, may also be used.

The oxygenous fluid required for the reaction may consist of compressed oxygen or compressed air; however it may also be a supercritical mixture of oxygen and water. According to the invention the reaction is performed in the form of a flame, a so-called "wet high pressure flame", (cf. W. Schilling, E. U. Franck, "Combustion and Diffusion Flames at High Pressures", Ber Bunsenges Phys Chem. 92, 631–636 (1988)). The oxidation is similar to combustion: the released reaction heat results in high temperatures (1400–3000K) and consequently a substantial acceleration in the reaction. Thanks to the high temperatures a very short sojourn time in the reaction region, which when compared with the known processes (reaction at 800–900K) is smaller by roughly three orders of magnitude, is adequate for the constituents to be decomposed.

The wet high pressure flame is located in a core flow, which consists of the fluids flowing through a burner nozzle into the reactor. Between the supercritical core flow and the subcritical by-pass flow, which is produced by cooling water, there occurs mass transfer and also heat transfer. Thanks to the short sojourn time required to destroy the noxious substances, the transport processes between the core and by-pass flow only slightly impair decomposition.

The wet high pressure flame may be a diffusion flame, in which the oxygenous fluid and the waste water/fuel fluid are fed separately into the reaction region. However it may also be a premixed flame, with which the reaction components are mixed before they exit the burner nozzle. With a premixed flame a pilot flame is advantageously used, in which hydrogen, for example, is used as an additional fuel. The pilot flame is provided firstly for ignition and secondly as the flame holder.

BRIEF DESCRIPTION OF THE DRAWINGS

FIG. 1 schematically illustrates a reactor made according to the present invention;

FIG. 2 is a partial view of a burner nozzle made according to the present invention having a diffusion flame;

FIG. 3 is a partial view of a nozzle of a cross-flow burner;

DESCRIPTION OF THE PREFERRED EMBODIMENTS

Figure 4:
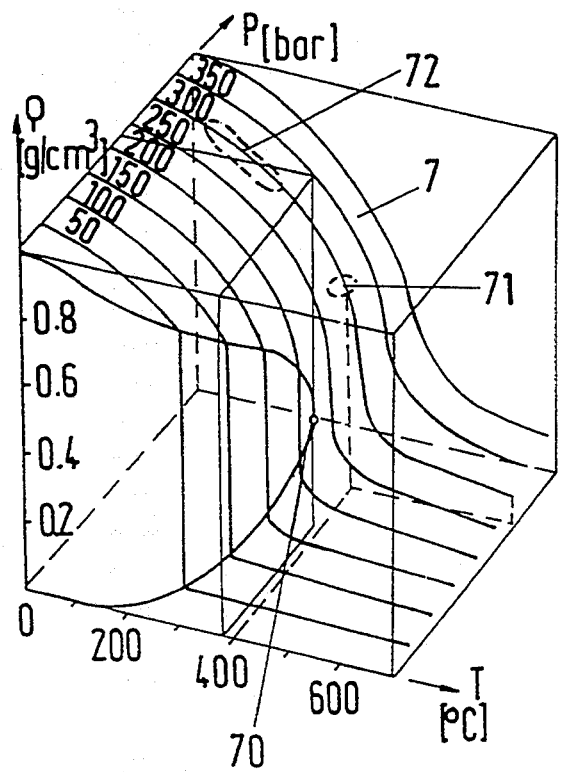
FIG. 4 shows a curve of state of pure water.

In FIG. 1 is represented an installation with which the SCWO process as specified by the invention can be performed. In the reactor 1 having a burner nozzle 2 is performed the wet oxidation in a supercritical core flow 3, which is enveloped by a subcritical by-pass flow 4. The waste water with the constituents W (=organic constituents and salts) is conveyed from the reservoir 10 with a high pressure pump 11 into a mixing device 12, where mixing with a fuel (for example methane $CH_4$) from a reservoir 20 (pump or compressor 21) occurs. The mixture then flows through a heater 13 and a mixer 14 downstream of the heater, from which it enters the burner nozzle 2 via the inlet point 15 as a single-phase fluid. Parallel thereto an oxygenous fluid, which is introduced via inlet point 45 into the burner nozzle 2, is produced from oxygen from a reservoir 30 (pump or compressor 31) and cooling water from a reservoir 40 (pump 41) by means of a first mixer 42, a heater 43 and a second mixer 44. The reaction occurs in the wet high-pressure flame.

In front of a metering device 46 at the inlet of the mixer 42 the cooling water line has a branch to the inlet 405 for the by-pass flow 4. The cooling water is supplied via a distribution duct 47 and an inlet point 48 in the form of a annular gap into the interior of the reactor 2, where it forms the by-pass flow 4. The burner nozzle 2 can be protected by thermal insulation 49 from the by-pass flow 4. In the upper region of the reactor is performed a mixing of the by-pass flow 4 with the core flow 3. The outlet flow conveying the reaction products travels through a common outlet point and a line 16 into a cooling device 17 (cooling water 171, 172). After a throttle device 18 the outlet flow is separated in a separator 6 into a condensed part 61 and a gaseous part 62. Relief devices may also be connected after the separator 6 instead of the throttle device 18.

The by-pass flow 4 can be provided with a tangential velocity component by built-in baffles (not shown) or by non-axial injection, so that stable lamination is produced by the rotating by-pass flow 4 at the level of the reaction zone. As a result the heat and mass transfer between the core flow and by-pass flow is reduced.

The mixing devices 12, 14, 42 and 44 are preferably constructed as stationary mixers. The heaters 13 and 43 are provided as electrical resistance heatings in the plant shown in FIG. 1. However for the purpose of energy saving they may also be coupled in a known manner to the cooler 17 so that heat can be recovered (see e.g. K. C. Swallow et al, "The MODAR Process . . . ", Waste Management 9, 19–26 (1989). When manufacturing a single-phase supercritical waste water/fuel fluid, salt precipitation can occur (in the form of crystals or brine droplets), which results in deposits in the heater 13, in the mixer 14 and/or in the burner nozzle 2. As a remedy a water-soluble fuel, for example, can be used instead of the gaseous fuel, in order to thus produce a single-phase subcritical mixture. Or the heating of the mixture can be dispensed with, so that the mixture enters the reactor 1 in two phases through the burner nozzle 2 and complete mixing to form a single-phase fluid does not occur until the temperature increase in the reaction zone above the burner nozzle 2.

The methane (or also another gaseous fuel) and the oxygen in the reservoirs 20 and 30 respectively may for example be made available as cryogenic liquids.

FIG. 2 represents a coaxial burner nozzle 2 having a core flow 3 and a diffusion flame 5. The waste water/fuel fluid (arrow 15') flows through the central pipe 22 and the oxygenous fluid (arrow 45') flows through the outer pipe 23. The central pipe 22 may for example slightly rise above the outer pipe 23 (cf. FIG. 1). The by-pass flow 4 is indicated by arrows 4'. Oxidation, which is similar to combustion, occurs in the conical flame 5. The transport of the educts ($CH_4$, organic constituents of W; $O_2$) is indicated by the arrows 32 and 33 respectively, and the transport of products P ($CO_2$, CO, inter alia) by arrow 34. The energy released during the reaction partly flows on the one hand to the outside (arrow 50), and on the other hand towards the burner nozzle 2 (arrow 51). The second part of this energy (and also possibly the return of heat by conduction and convection) heats the escaping core flow 3 to a temperature at which the ignition of the reaction occurs. Between flame 5 and core flow 3 and also between the core flow 3 and by-pass flow 4 occur mass transfer processes, which are indicated by double arrows 35 and 36 respectively.

In the case of a coaxial burner (FIG. 2) the two fluid jets leave the nozzle 2 parallel to one another, as a result of which a relatively poor mixing of the educts ensues. In the case of a cross-flow burner, as illustrated in FIG. 3, the two flows 15" and 45" meet at an acute angle. In this case a greater mixing intensity is achieved, which results in a reduction of the reaction zone—i.e. in a reduction of the flame length.

FIG. 4 shows a curve of state 7 of pure water, the points of which represent the thermodynamic states of equilibrium—given by temperature T, pressure p and density. The critical point 70 is located when $T=374°$ C. and $p=221$ bar. If one proceeds from the fact that the curve of state 7 applies approximately for the two fluids containing the educts even during wet oxidation, then by means of FIG. 4 the SCWO process according to the invention can be characterized in more detail as follows: The process has to be performed at roughly 250 bar at least, for example in the region of 300 bar. So that a flammable mixture is produced from the two fluids, their supercritical states have to be located for example in zone 71 of the curve of state 7. The subcritical states of the by-pass flow are accordingly located in a zone 72.

In order to protect the interior of the pressure vessel from corrosion a coating may be provided. As experience has indeed shown that coatings lose their protective action because of cracking, this solution is generally disregarded. Another solution is shown by means of the embodiment, shown in FIG. 5, of the reactor 1 according to the invention: Two by-pass flows 4a and 4b are provided which are largely separated by a pipe 110.

Figure 5:
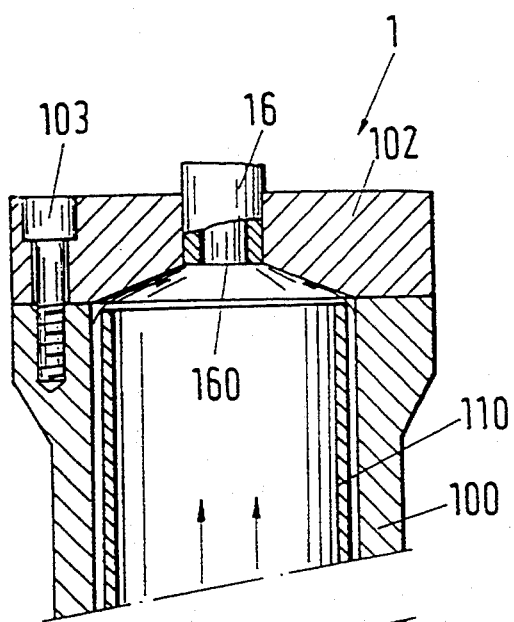
FIG. 5 is a longitudinal section of a second embodiment of the reactor of the present invention.

The reactor 1 in FIG. 5 shows the following components: a tubular wall piece 100, at both ends of which cover pieces 101 and 102 are attached with screws 103; the tubular shell 110, which leaves a annular gap 111 free for the by-pass flow 4b and which is placed on a base 112; also a cross-flow burner, the nozzle 2 of which is constructed so that it is rotationally symmetrical with the inner pipe 22 and the outer pipe 23—in contrast to the nozzle in FIG. 3. The cover piece 101, which forms the base plate of the reactor 1, comprises connection points 150 (for the waste water/fuel fluid), 450 (for the oxygenous fluid) and also 460 (for cooling water). A further connection point 470 (for cooling water) is located at the lower end of the wall piece 100. By the base 112 are formed two annular gaps 47a and 47b, via which the cooling water for the by-pass flows 4a and 4b are fed into the reactor interior (through bores 48a and respectively the annular gap 48b). The tubular shell 110 is advantageously made from ceramics, for example aluminium oxide or silicon carbide.

The initial ignition of the wet high-pressure flame may result from the fact that before entering the burner nozzle 2 the fluids carrying the educts are heated to a sufficiently high temperature. When performing the process according to the invention with the reactor 1 shown in FIG. 5 it is recommended that only the outer by-pass flow 4b be operated until the occurrence of the initial ignition. As a result the required temperature in the reaction zone is reached more quickly.

A special ignition device may also be provided in the form of a resistance wire or a spark generator. An ignition device may simultaneously have the function of a flame holder, which ensures that the flame remains stationary and is not "torn away" by the flow.

Figure 6:
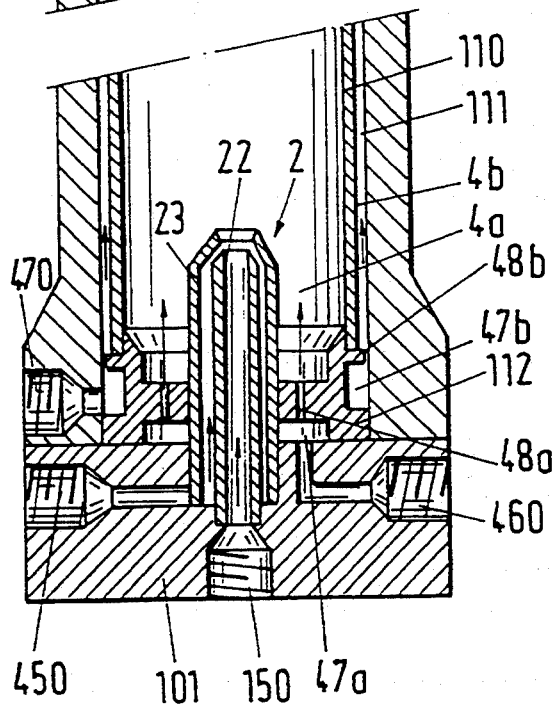
FIG. 6 is a partial view of a burner made according to the present invention for a premixing flame.
Figure 6:
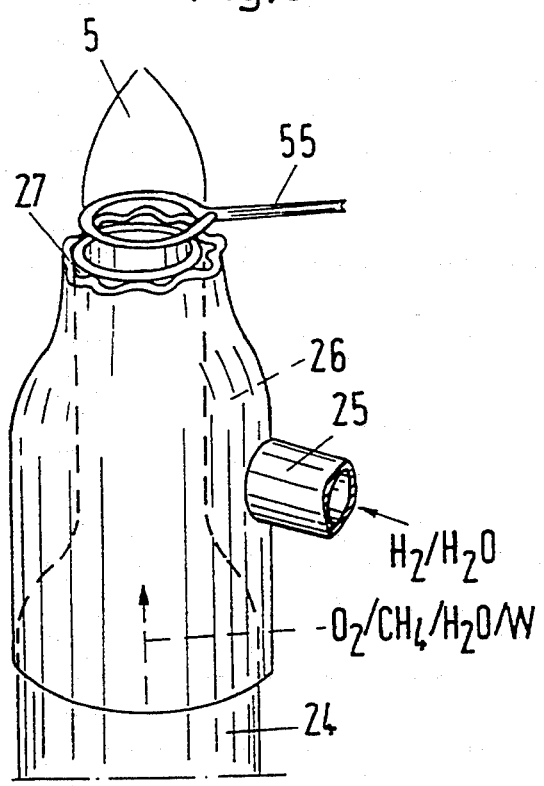

FIG. 6 shows a burner nozzle 2 for a premixing flame. The educts travel in the already mixed state through the supply pipe 24 into the reaction zone 5. Flame stabilization can be achieved with a pilot flame, which is produced with a hydrogenous fluid (supply line 25, distribution duct 26, nozzle apertures 27). Ignition can also occur with a pilot flame. In addition in FIG. 5 a circular flame holder 55 is also represented.

What is claimed is:

1. A process of purifying waste water including organic matter by wet oxidation under supercritical conditions comprising the steps of preheating the water, mixing the water with a fuel to form a water-fuel combined mixture, directing the mixture and an oxygenous fluid to a supercritical zone formed in a central region of a tubular reactor, surrounding the supercritical zone with a by-pass flow formed of cooling water to thereby form a subcritical zone surrounding the supercritical zone, reacting the combined mixture and oxygenous fluid in the supercritical zone so that a flame is formed, entraining reaction products formed in the reactor in the cooling water, and removing the cooling water/and reaction products therein from the reactor.

2. A process according to claim 1 including the step of providing the fuel as a gaseous fuel.

3. A process according to claim 2 wherein the gaseous fuel includes methane.

4. A process according to claim 3 wherein the gaseous fuel consists substantially of methane only.

5. A process according to claim 1 including the step of preparing the oxygenous fluid by mixing water and a gas including oxygen to form a single-phase mixture thereof.

6. A process according to claim 5 wherein the gas consists of substantially oxygen only.

7. A process according to claim 1 including the step of providing a burner nozzle, and wherein the step of directing comprises flowing the mixture and the oxygenous fluid separately of each other to a discharge opening of the nozzle, and discharging the mixture and the oxygenous fluid from the opening to form the flame.

8. A process according to claim 1 including the step of providing a burner nozzle, and wherein the step of directing comprises the steps of combining the mixture and the oxygenous fluid in the nozzle and discharging the combined mixture and oxygenous fluid from a discharge opening of the nozzle to form the flame.

9. A process according to claim 8 including the step of forming a pilot flame proximate the discharge opening of the nozzle.

10. A process according to claim 1 wherein the tubular reactor is a cylindrical reactor.

11. A process according to claim 10 including the step of imparting a rotary motion about an axis of the reactor to the by-pass flow of cooling water.

12. A process according to claim 1 including the step of preparing the oxygenous fluid which comprises flowing water to the reactor and entraining oxygen in the water for sustaining the reacting step.

13. A process according to claim 1 wherein the step of surrounding comprises flowing cooling water from a cooling water source to the reactor.

14. A process according to claim 13 including the step of diverting a portion of the cooling water upstream of the reactor and using the diverted water in a step of preparing the oxygenous fluid by entraining the oxygen therein.

15. A process of purifying waste water including organic matter by wet oxidation under supercritical conditions comprising the steps of mixing the water with a fuel to form a water-fuel mixture, preparing an oxygenous fluid by mixing water with a gas including oxygen, directing the mixture and the oxygenous fluid to a supercritical zone formed in a central region of a cylindrically shaped reactor, enveloping the supercritical zone with a by-pass flow formed of cooling water to thereby form a subcritical zone surrounding the supercritical zone, reacting the combined mixture and oxygenous fluid in the supercritical zone and forming a flame, and removing reaction products formed in the reactor and the cooling water from the reactor.

16. A process according to claim 15 including the step of preheating the water which forms the mixture.

17. A process according to claim 15 including the step of providing a burner nozzle, and wherein the step of directing comprises flowing the mixture and the oxygenous fluid separately of each other to a discharge opening of the nozzle, and discharging the mixture and the oxygenous fluid from the opening to form the flame.

18. A process according to claim 15 including the step of providing a burner nozzle, and wherein the step of directing comprises the steps of combining the mixture and the oxygenous fluid in the nozzle and discharging the combined mixture and oxygenous fluid from a discharge opening of the nozzle to form the flame.

19. A process of purifying waste water including organic matter and salt by wet oxidation under supercritical conditions comprising the steps of mixing the water with a fuel to form a water-fuel mixture, preparing an oxygenous fluid including oxygen, directing the mixture and the oxygenous fluid to a supercritical zone formed in a central region of a tubular reactor, enveloping the supercritical zone with a by-pass flow formed of cooling water to thereby form a subcritical zone surrounding the supercritical zone, reacting the combined mixture and oxygenous fluid in the supercritical zone so that a flame is formed, precipitating the salts during the reaction in the supercritical zone, transporting the precipitated salts to the subcritical zone, and removing the precipitated salts and the cooling water from the reactor.

* * * * *